United States Patent [19]

Aron

[11] 4,283,904
[45] Aug. 18, 1981

[54] GRASS FORAGE HARVESTER

[75] Inventor: Jerome Aron, Dossenheim sur Zinsel, France

[73] Assignee: Kuhn, S.A., Saverne, France

[21] Appl. No.: 45,326

[22] Filed: Jun. 4, 1979

[30] Foreign Application Priority Data

Jun. 7, 1978 [FR] France .................. 78 17703

[51] Int. Cl.³ .................. A01D 55/26; A01D 55/00
[52] U.S. Cl. .................. 56/13.9; 241/236; 56/16.4; 56/289
[58] Field of Search .................. 56/13.9, 13.6, 13.7, 56/13.8; 241/236

[56] References Cited

U.S. PATENT DOCUMENTS

| 2,956,602 | 10/1960 | Gronberg | 241/243 |
| 3,463,406 | 8/1969 | Musgrave | 241/190 |
| 3,916,605 | 11/1975 | Richards et al. | 56/13.9 |
| 4,033,518 | 7/1977 | Fleming et al. | 56/13.9 |
| 4,077,573 | 3/1978 | Kersey et al. | 241/243 |

Primary Examiner—Robert A. Hafer
Attorney, Agent, or Firm—Young & Thompson

[57] ABSTRACT

A grass forage harvester has mowing and/or gathering mechanism whereby cut grass is brought to cutter mechanism comprising a rotor with peripheral cutter blades and to impelling mechanism comprising fan or projector vanes. The said cutter blades are articulated on the rotor and cooperate with at least one counter-blade which is placed between the said cutter mechanism and the said impelling mechanism to retain the grass so that it is cut into small pieces before it passes to the impelling mechanism. There is an elevator funnel through which the small pieces are raised for delivery into a vehicle.

12 Claims, 6 Drawing Figures

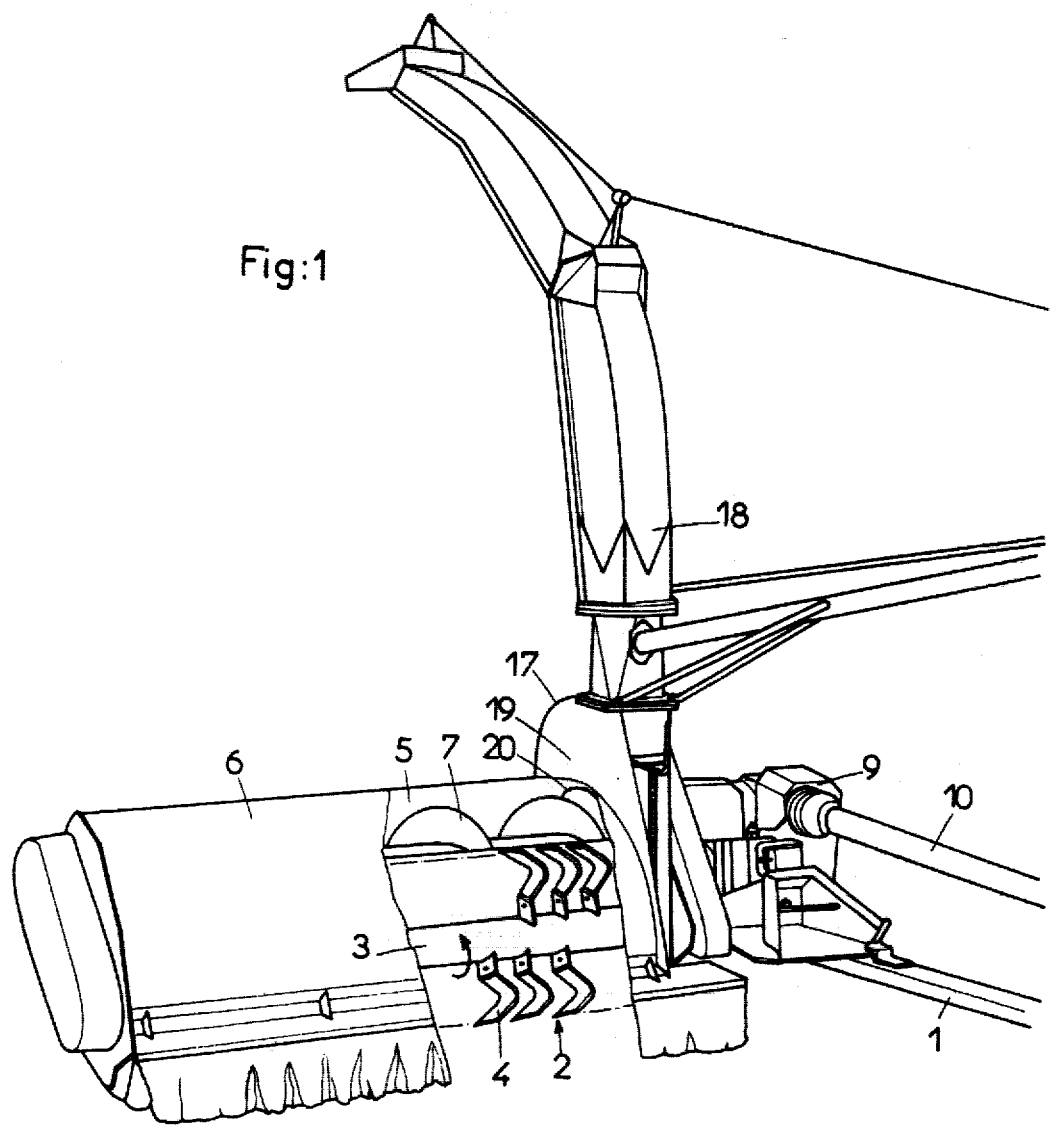
Fig:1

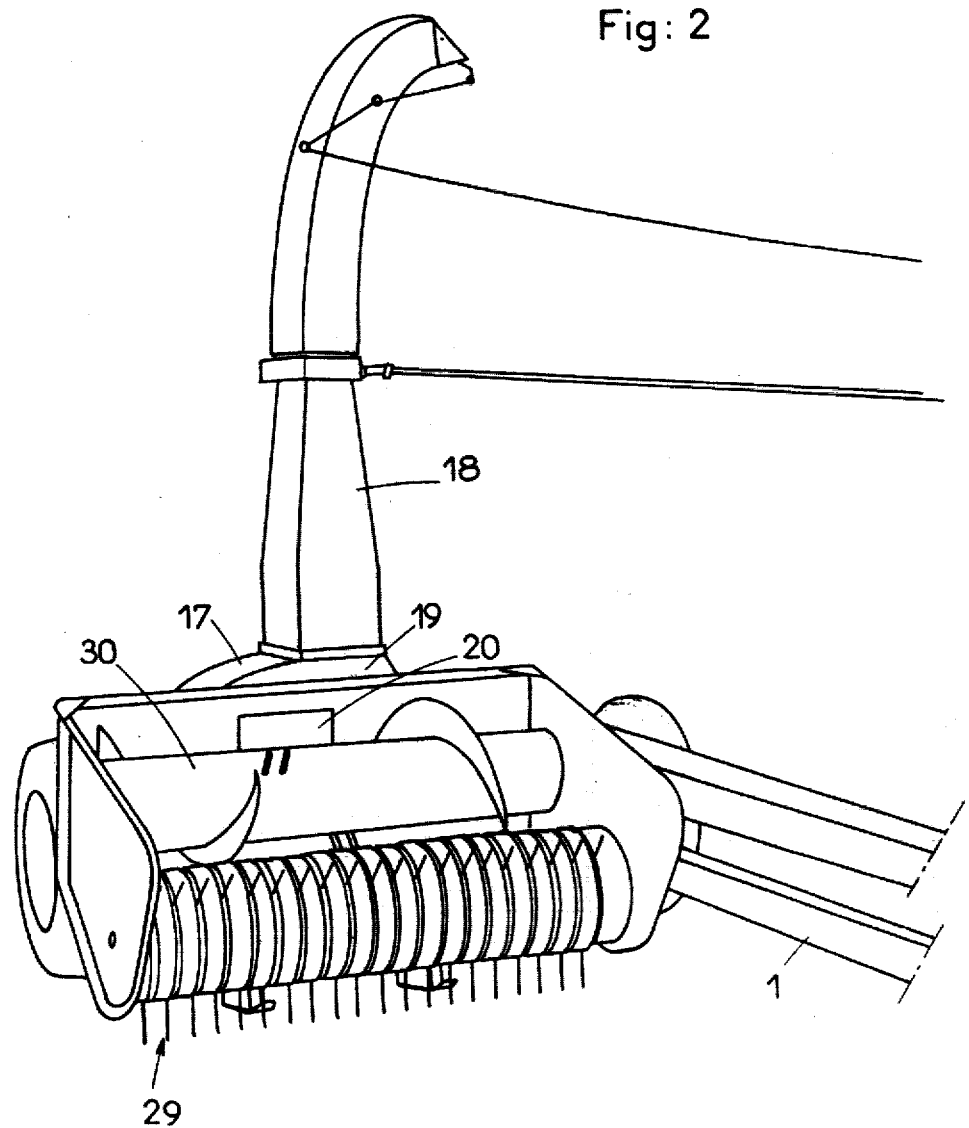
Fig: 2

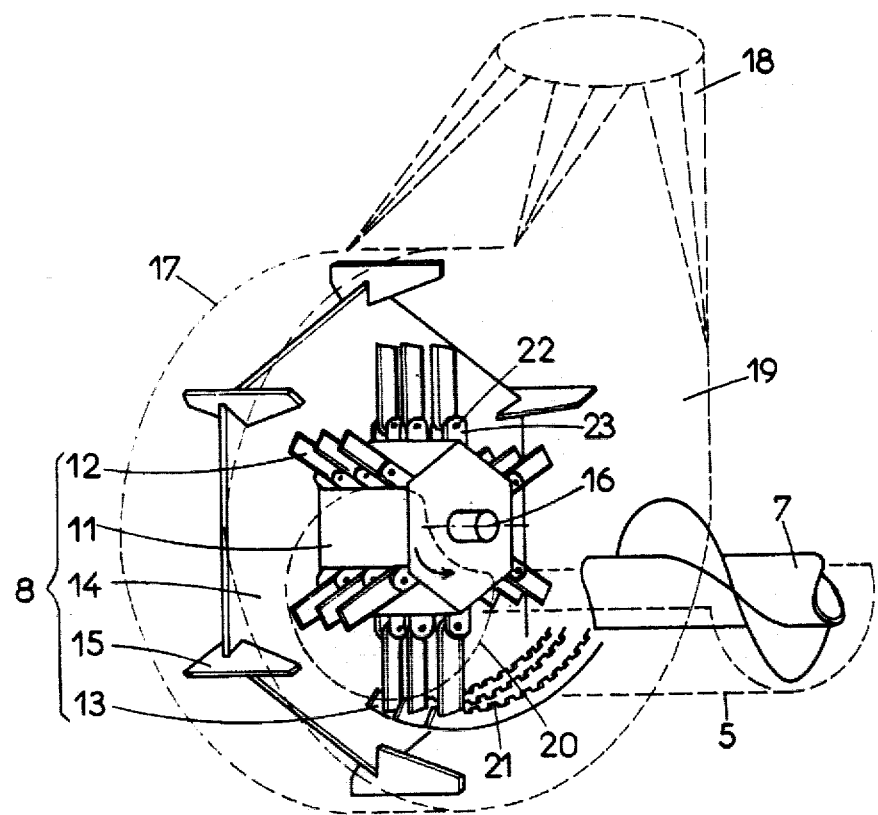
Fig: 3

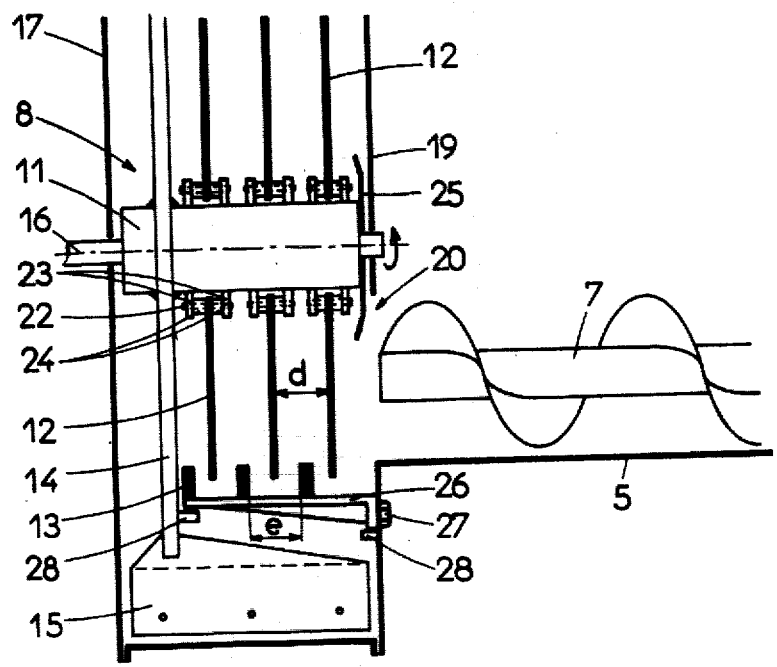
Fig: 4

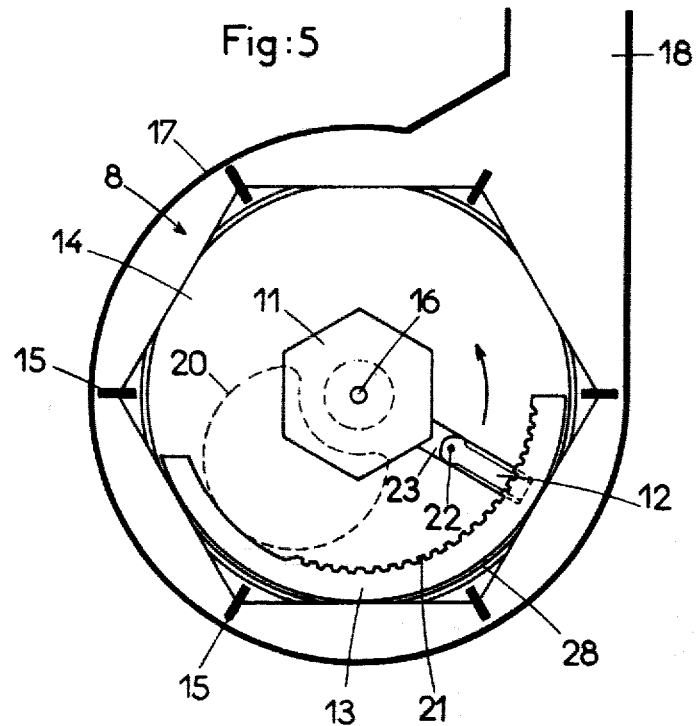
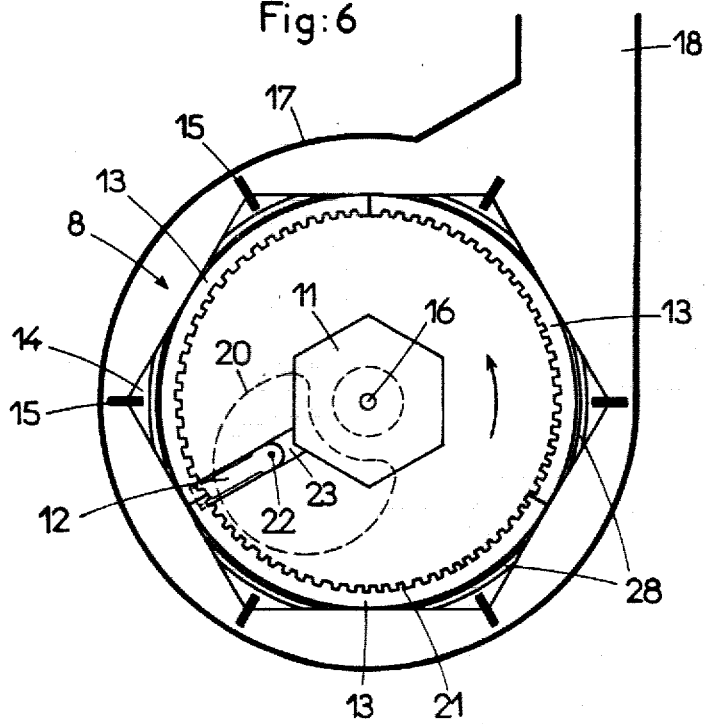

GRASS FORAGE HARVESTER

The present invention relates to grass forage harvesters equipped with an element for mowing or gathering the grass, from which the grass is conveyed to a cutting and projector device which is composed of a rotor, equipped with cutter blades on its periphery, and of a disc carrying projector and fan vanes.

For successful ensilage it is necessary that the grass to be harvested should be cut regularly into small pieces of about 5 to 10 cm. This permits good conservation of the fodder, facilitates removal from the silo and is favourable to consumption by the animals. In order to respond to this requirement certain known forage harvesters possess a chopper-projector cylinder disposed transverse of the direction of arrival of the grass. This cylinder is composed of a flywheel provided with cutter blades and fan vanes which work substantially on one and the same diameter. However when the grass arrives irregularly or in batches at the said cylinder, it is cut into pieces of variable lengths and even often ejected without being cut. This is due especially to the design of the chopper-projector device which permits the grass to pass freely from the cutter blades to the fan vanes without taking account of the length of the stalks.

Other known forage harvesters comprise a chopper-projector cylinder disposed so that the grass arrives radially at the said cylinder. The latter is equipped with numerous angled cutter blades which are disposed on the periphery and effect the cutting and discharge of the grass at the same time. For cutting they co-operate with one or two counter-blades disposed transversely in relation to the cylinder. In this case there is still an irregularity in the length of the cut pieces of grass by reason of the direct discharge which the cutter blades themselves effect without taking account of the length of the stalks. Moreover the grass is subjected to a significant crushing by reason of the fact that the chopper-projector cylinder in a way rolls it, which is prejudicial and can especially cause gastric troubles in the animals.

On other known machines, cutter blades fixed on a rotor co-operate with counter-blades situated in one and the same plane, outside the housing surrounding the discharge device. On these machines the grass can pass between the counter-blades and gain access to the said discharge device without being cut to the desired length. This can be the case especially when it arrives in large quantities. Thus nor do these machines ensure a fine and regular cutting.

Furthermore in the above-mentioned forms of embodiment the cutter blades are fixed rigidly on their cylinder and can therefore be subjected to damage if a hard object should be mixed into the grass.

Finally the forage harvesters equipped with these chopper-projector cylinders are no longer usable for the daily feeding of the stock, since for this feeding it is preferable that the grass should be cut more coarsely and not bruised. Now with these forage harvesters it is nearly impossible for the user to remove the cutter blades from the chopper-projector cylinder in order to eliminate the cutting effect, since this is a lengthy operation which often can be carried out only by a specialist, especially with regard to the refitting operation which necessitates a precise setting of the cutter blades.

The purpose of the present invention is to provide a simple forage harvester with a cutting and projection device which does not present the above-stated drawbacks of the known machines.

BRIEF SUMMARY OF THE INVENTION

To this end one important characteristic of the invention consists in that the cutter blades of the cutter device are articulated on their rotor and that they co-operate with at least one counter-blade made in the form of a segment, this counter-blade being placed between the articulated cutter blades and the fan and projection vanes and retaining the grass until it is cut into small pieces. Thus this device ensures a fine and regular cutting of the whole of the grass intended for ensilage.

Moreover, since the cutter blades are articulated on their rotor, they can fold about their articulation if they should encounter a hard object introduced into the device. This avoids their deformation or even breakage in the case of such encounters.

Further Description and Advantages of the Invention

In the forage harvester according to the invention the precise and regular cutting of the fodder is obtained with means substantially less onerous and troublesome than those used on the known "precision" forage harvesters which especially necessitate fodder compression rollers and have a rotor with fixed cutter blades which at the same time function as ejector vanes.

According to another characteristic of the invention several counter-blades are placed at substantially regular intervals one behind the other and at the same distance from the axis of rotation of the rotor, the space separating them being open so as to permit the cut fodder to pass through the said space before being discharged by the fan and projector vanes. The said counter-blades thus form a kind of grill which calibrates the grass and permits passage of only that which is cut into small pieces.

According to another characteristic of the invention the counter-blade or blades is or are perpendicular to the axis of rotation of the rotor and the fan and projector vanes are situated directly in extension of the cutter blades and of the counter-blade or blades. This arrangement favours the passage of the grass into the cutter and projector device. In fact, when the cutter blades are driven in rotation, they project the grass outwards squarely in the direction of the fan and projector vanes.

According to another characteristic of the invention the extremities of the cutter blades of the rotor are more remote from the axis of rotation of their rotor than the active edge of the counter-blade or blades. Thus clean cutting is obtained by a scissors action.

In accordance with another characteristic of the invention the interval between the cutter blades and/or the counter-blades is regulable. This permits the user himself to select the length of the pieces of grass intended for ensilage.

According to another characteristic of the invention the counter-blade or blades is or are removable. By virtue of this characteristic it is possible with the forage harvester to pick up grass intended for the daily feeding of the stock. For this purpose it is sufficient to withdraw the counter-blade or blades in order to eliminate the cutting effect and permit the grass to arrive directly at the fan and projector vanes.

Further characteristics and advantages of the invention will appear from the following description with reference to the accompanying drawings, which represent by way of non-limitative example several forms of embodiment of the forage harvester in accordance with the invention and wherein:

BRIEF DESCRIPTION OF THE VIEWS IN THE DRAWINGS

FIG. 1 represents an overall view, with partial section at the level with the moving element, of a first example of embodiment of a forage harvester according to the invention, FIG. 2 represents an overall view of a second example of embodiment of a forage harvester according to the invention, FIG. 3 represents a perspective view, on a larger scale, of a cutter and projector device according to the invention, FIG. 4 represents diagrammatically a front view of a cutter and projector device according to the invention, FIG. 5 represents diagrammatically a side view of a cutter and projector device according to the invention, FIG. 6 represents a view analogous with that in FIG. 5, of a variant of embodiment.

DETAILED DESCRIPTION OF THE PREFERRED EMBODIMENT

The grass harvester as represented in FIG. 1 can be hitched to a tractor (not shown) by means of a draw bar 1. By way of non-limitative example it comprises an element 2 for mowing standing grass. This element 2 is composed of a shaft 3 provided with flails 4 and driven in rotation during working. These flails 4 cut the grass at ground level and project it into a trough 5 disposed behind the said shaft 3. This shaft 3 is covered by a hood 6 extending as far as the trough 5 for the purpose of guiding the grass towards the latter. In this trough 5 there is housed a worm 7 substantially matching the form of the trough. This worm 7 is driven in rotation and thus brings the grass to a device 8 for cutting the grass into small pieces and projecting these towards a receptacle (not shown). This receptacle can be a trailer moving parallel with the forage harvester during working and permitting of transporting the grass for example to the silo to the feeding place. The driving of the various above-mentioned elements is effected from the power take-off shaft of the tractor, which is connected to a gear box 9 situated on the forage harvester, by means of a cardan shaft 10. Forage harvesters according to the invention can equally be equipped with a mowing element such as a cutter bar with cutter blades driven with an alternating, rotary or continuous movement.

The forage harvester as represented in FIG. 2 differs from that represented in FIG. 1 in that it comprises a pick-up device 29 intended to collect the previously mown grass. Thus the grass can be pre-tedded, which improves its quality. The grass thus collected is taken up by a feed worm 30 which gathers it towards the middle and introduces it into the device 8 for cutting the grass into small pieces and projecting these towards a receptacle. In this case the said device 8 is situated behind the feed worm 30. The forage harvesters according to the invention are not limited to the two forms of embodiment as described above. They can for example equally be realised in the form of self-propelled machines.

As may be seen from FIGS. 3 to 6, the above-mentioned device 8 for the cutting and projection of the grass is composed of a rotor 11 equipped with cutter blades 12 on its periphery, and of a disc 14 carrying fan and projector vanes 15. This device 8 is housed in a sheet metal casing 17 which is prolonged upwards by a funnel 18 through which the discharge of the cut grass is effected. This casing 17 further comprises in its lateral wall 19 an orifice 20 through which the grass is brought. The rotor 11 is advantageously disposed so that its cutter blades 12 work in planes substantially perpendicular to the direction of arrival of the grass. To this end, in the example of embodiment according to FIG. 1, the axis 16 of rotation of the rotor 11 is substantially parallel with the mowing element 2 and the worm 7. On the other hand in the example of embodiment according to FIG. 2 the rotation axis 16 of the rotor 11 is substantially perpendicular to the pick-up device 29 and to the feed worm 30.

In accordance with an important characteristic of the invention the cutter blades 12 are articulated on the rotor 11 and co-operate with at least one counter-blade 13 made in the form of a segment, this counter-blade 13 being placed between the articulated cutter blades 12 and the fan and projector vanes 15 and retaining the grass until it is cut into small pieces (FIGS. 3 to 6). The said counter blade 13 is advantageously made in the form of a segment which is curved so as partially to surround the rotor 11.

Thus during working the grass introduced between the rotor 11 and the counter-blade 13 is cut by the cutter blades 12 of the said rotor 11, which is driven in rotation, into small pieces the length of which is between about 5 and 10 cm. These small pieces of grass can then pass on either side of the counter-blade 13 which retains stalks which are still too long, so that they may be recut by the cutter blades 12. The said small pieces next arrive in the zone in which the fan and projector vanes 15 of the disc 14 are in motion, which vanes project the pieces out of the casing 17 through the funnel 18. The said disc 14 is advantageously concentric with the rotor 11 so that both elements can be driven in rotation by the same drive means, preferably situated outside the casing 17. Thus, rotor 11 is rotatable about a first axis 16 whilst disc 14 is rotatable about a second axis that is parallel to, and preferable coincident with, axis 16.

The fixing of the cutter blades 12 on the rotor 11 is effected by means of articulation spindles 22 substantially parallel with the rotation axis 16 of the said rotor 11. These articulation spindles 22 are lodged in sockets 23 fast with the rotor 11. For cutting, the blades 12 are kept positioned by centrifugal force. However they can also be held in the cutting position by springs. By virtue of these articulations the blades 12 can avoid damage when they encounter a hard body such as a stone mixed with the grass. The said blades 12 can either be disposed in lines as represented in the accompanying Figures, or be staggered in relation to one another for the purpose of uniformly distributing the cutting forces over the whole periphery of the rotor. Moreover they may have two cutting edges so as to be reversible when one cutting edge is worn.

Where several counter-blades 13 are provided these are placed at substantially regular intervals one behind the other and at the same distance from the rotation axis 16 of the rotor 11. The space separating the counter-blades 13 is open so as to permit the cut fodder to pass through the said space before being discharged by the fan and projector vanes 15. The assembly of these counter-blades 13 constitutes a kind of grill for calibrating the grass.

As appears from FIG. 4, the counter-blade or blades 13 is or are perpendicular to the rotation axis 16 of the rotor 11. Moreover the fan and projector vanes 15 are situated directly in extension of the cutter blades 12 and the counter-blade or blades 13. This is to say that vanes 15 move in a circular path that surrounds rotor 11 and counter-blade 13 and lie directly radially outwardly of blades 12 and axially overlap blades 12 in the sense that the axial extent of blades 12 along axis 16 and the axial extent of vanes 15 along axis 16 at least partly overlap. This arrangement avoids an accumulation of grass at the exit from the cutter device, since it passes in a straight line from the said device to the fan and projector vanes.

According to one characteristic of the invention the extremities of the cutter blades 12 of the rotor 11 are more remote from the rotation axis 16 of the said rotor than the active side or sides of the counter-blade or blades 13. Thus a clean cutting of the grass by a scissors effect is obtained. Moreover to favour the cutting of the grass the counter-blade or blades 13 comprise, on their side directed towards the rotor 11, notches 21 which retain the grass during cutting.

The cutter blades 12 are attached to the rotor 11 in such manner that they can be moved towards or away from one another by axial displacement on their respective articulation spindles 22. This permits of adjusting the interval d between two adjacent cutter blades 12 according to the desired cutting width. This interval d can be defined for example with struts 24 of different lengths or with other known means which permit of arresting the cutter blades 12 in the desired position.

In the example of embodiment as represented in FIG. 4 the rotor 11 carrying the cutter blades 12 has a cylindrical form. However it can also have a polygonal form in order to present sharp edges which cause a slight fanning action intended to spread the grass over the counter-blades 13. In the course of tests good results were obtained with a rotor of hexagonal form as represented in FIGS. 3, 5 and 6. Moreover the said rotor 11 can be provided with a lateral deflector 25 intended to guide the grass fed by the worm 7 towards the counter-blade or blades 13 and thus prevent it from clinging to the rotor 11 or to the mountings of the cutter blades 12.

In the variant of embodiment as represented in FIG. 6 counter-blades 13 are placed end to end and completely surround the rotor 11. In this case the cutting of the grass can be effected over the whole trajectory of the cutter blades 12. Thus this arrangement guarantees a fine cutting of the whole of the grass since there is no possibility of the grass being able to pass beyond the counter-blades 13 without being cut.

The counter-blade or blades 13 is or are disposed on brackets 26 which are fixed for example by means of screws 27 on the lateral wall 19 of the casing 17 surrounding the cutter and projector device 8 (FIG. 4). The fixing of the counter-blade or blades 13 on the said brackets 26 can advantageously be effected by means of easily releasable devices such for example as screws or straps, in order that they may easily be displaced on these brackets 26. Thus it is for example possible to adjust the interval e between the adjacent counter-blades 13 as a function of the position of the cutter blades 12 of the rotor 11 and/or of the length of stalks which it is desired to obtain.

According to a further characteristic of the invention the counter-blade or blades 13 are removable. For this purpose it is sufficient to detach their support brackets 26 from the lateral wall 19 of the casing 17 and withdraw the counter-blade or blades 13 and the said brackets 26 together from the said casing 17. For this purpose the latter has on its periphery at least one aperture permitting access to the interior of the casing 17. By virtue of the withdrawal of the counter-blade or blades 13 the cutting action of the cutter blades 12 is eliminated, which permits the grass to arrive without being cut at the fan and projector vanes 15 which effect its discharge. The grass thus harvested is excellent for the daily feeding of the stock. This characteristic likewise permits the rapid positioning of counter-blades 13 of different forms or with different arrangement on their brackets 26. To facilitate the refitting of the counter-blade or blades 13 and the brackets 26 in the casing 17 a guide slideway 28 of substantially circular form is provided on the disc 14 and the wall 19. Thus for refitting it is sufficient to place the counter-blade or blades 13 and their brackets 26 on these slideways 28 so that they are automatically situated at substantially the right distance from the rotation axis 16 of the rotor 11. Thus this operation does not necessitate any particular adjustments and can easily be carried out by the user of the machine.

It is quite apparent that still further improvements, modifications or additions may be made or certain elements may be replaced by equivalent elements, without thereby departing from the scope of the present invention.

What is claimed is:

1. A grass forage harvester comprising an element for mowing or gathering grass, a cutter and projector device which comprises a rotor rotatable about a first axis with cutter blades articulated on its periphery and a disc carrying fan and projector vanes, said disc being mounted for rotation about a second axis parallel to said first axis such that said vanes move in a circular path surrounding said rotor with cutter blades, said vanes lying directly radially outwardly of said cutter blades and axially overlapping said cutter blades, and at least one counter-blade placed between the articulated cutter blades and the fan and projector vanes and retaining the grass until it is cut into small pieces.

2. A forage harvester according to claim 1, wherein the counter-blade is in the form of a segment which partially surrounds the rotor with cutter blades and is disposed inside said path.

3. A forage harvester according to claim 1, wherein each counter-blade is situated in a plane perpendicular to the rotation axis of the rotor and, as seen from the front, the fan and projector vanes are situated directly in extension of the cutter blades and of the said counter-blade.

4. A forage harvester according to claim 1, wherein the interval between the cutter blades of the rotor is regulable.

5. A forage harvester according to claim 1, wherein several counter-blades are placed one behind the other and the interval between the adjacent counter-blades is regulable.

6. A forage harvester according to claim 1, wherein each counter-blade is removable.

7. A forage harvester according to claim 6, wherein each counter-blade is disposed on brackets fixed on the lateral wall of a casing which surrounds the cutter and projector device.

8. A forage harvester according to claim 7, wherein the disc equipped with fan and projector vanes comprises a slideway of substantially circular form for the guidance of the counter-blades and of the brackets thereof.

9. A forage harvester according to claim 7, wherein the lateral wall of the casing which surrounds the cutter and projector device comprise a slideway of substantially circular form for the guidance of the counter-blades and of the brackets thereof.

10. A forage harvester according to claim 2, wherein several counter-blades in the form of segments are placed end to end.

11. A forage harvester according to claim 1, wherein the rotor of the cutter and projector device is in the form of a regular polygon.

12. A forage harvester according to claim 1, wherein the rotor of the cutter and projector device comprises a lateral deflector intended to guide the grass towards the counter-blades.

* * * * *